Oct. 5, 1954
T. W. PUTNAM
2,690,846
PIPE CONVEYING APPARATUS
Filed Dec. 4, 1950
2 Sheets-Sheet 1
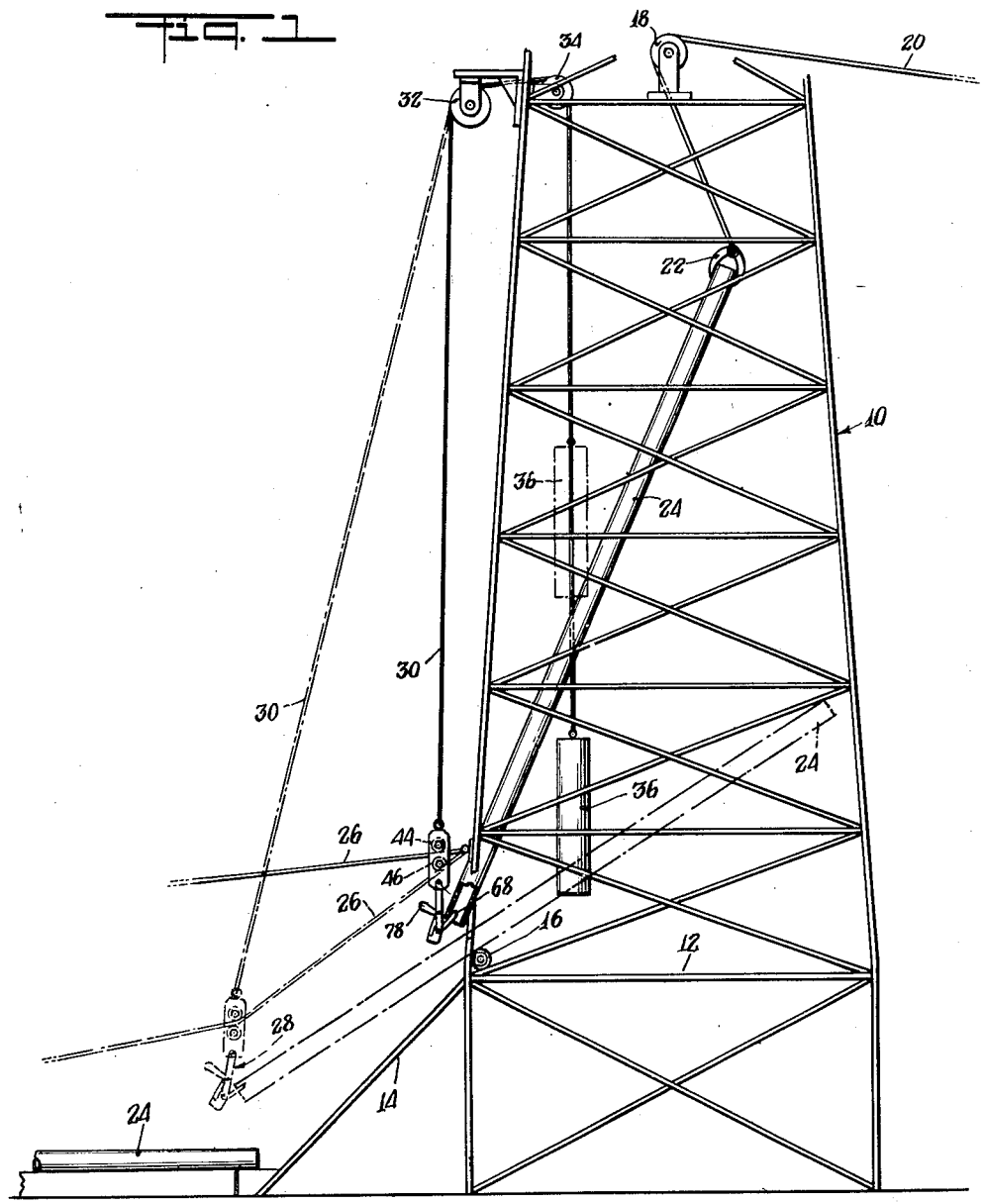
INVENTOR.
Tom. W. Putnam
BY
Charles E. Lightfoot
ATTORNEY

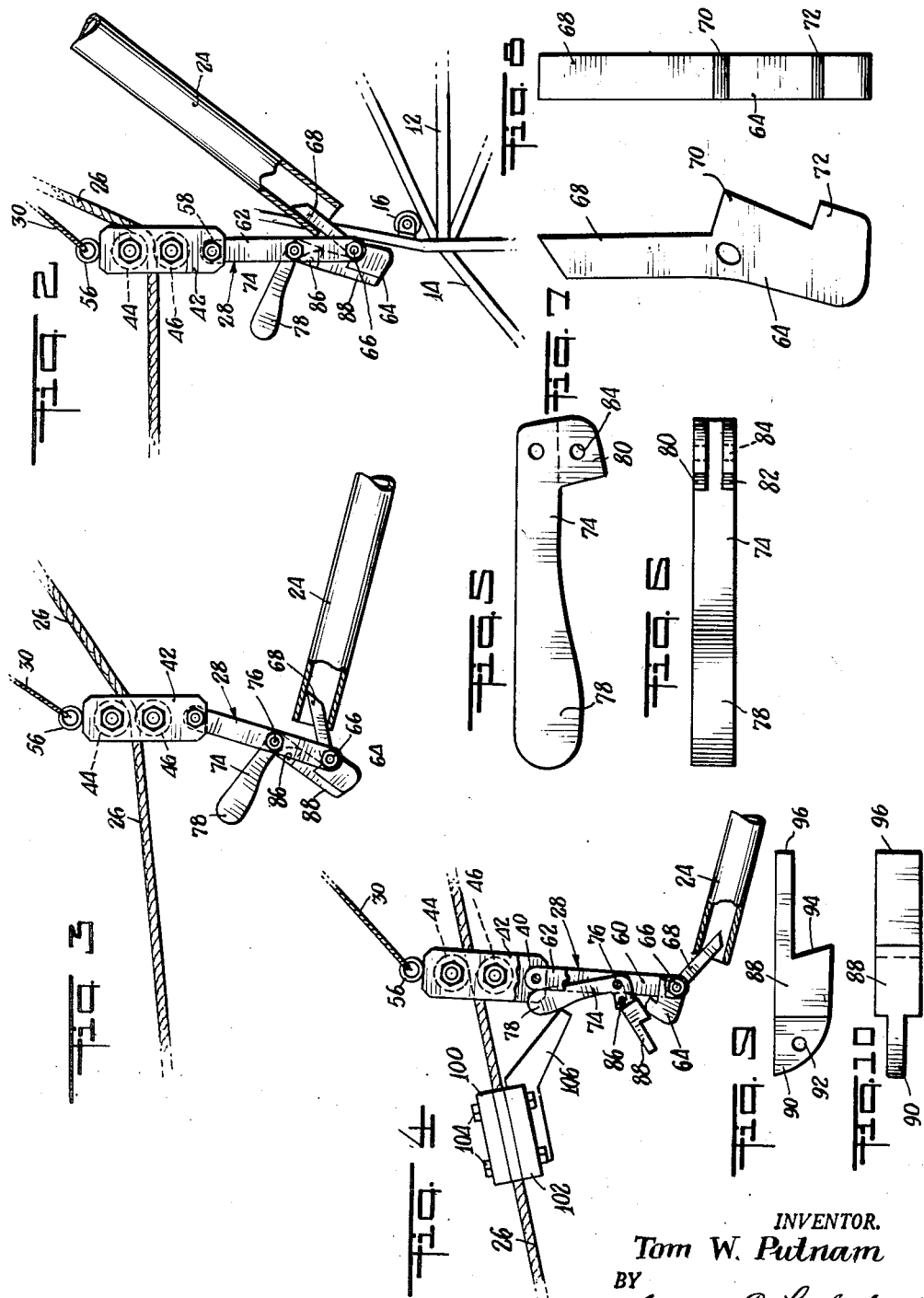

Patented Oct. 5, 1954

2,690,846

UNITED STATES PATENT OFFICE 2,690,846

PIPE CONVEYING APPARATUS

Tom W. Putnam, Houston, Tex.

Application December 4, 1950, Serial No. 199,109

2 Claims. (Cl. 214—2.5)

This invention relates to pipe conveying apparatus, and more particularly to means for handling sections of pipe in carrying out oil well operations.

The invention hereinafter shown and described is a continuation-in-part of the invention of the same applicant disclosed in pending application, Serial No. 177,253, filed August 2, 1950.

The invention has particular application in the removal of pipe from oil wells and contemplate the provision of convenient means for conveying the sections of pipe one at a time as they are withdrawn from the well, to some convenient location where they may be stored for future use.

In carrying out such pipe handling operations it has been necessary heretofore to employ several men in order to assure the proper adjustment and securing of the pipe sections to the conveying means, and the release of the pipe therefrom when the same has reached the location where it is to be stored. The apparatus used in such pipe conveying operations has heretofore usually taken the form of a hook suspended from a cableway, which hook can be applied to the end of a pipe section to support the same while the pipe is being conveyed to the place of storage. Such an arrangement, however, presents a very burdensome problem, in that much time and labor is consumed in removing the hook from each section as it reaches its destination, and the removal of the hook by the usual method of knocking it out of the end of the pipe is attended by considerable danger of injury to the operator.

The present invention has for its principal object the provision of pipe handling apparatus whereby sections of pipe can be rapidly and safely removed from the supporting structure as they are withdrawn from the well, and conveyed to a suitable location, where they are automatically released from the conveyor.

Another object of the invention is the provision of pipe handling apparatus which requires only a single operator for securing the sections of pipe to the conveying means, and which automatically releases each section upon arrival at the desired location and returns the conveyor for the next section.

A further object of the invention is to provide pipe handling apparatus having pipe engaging pipe handling means which is capable of securely holding the pipe while the same is being conveyed, and which is positive in its releasing action when the pipe has reached the desired location.

A further object of the invention is the provision of releasing mechanism for use in pipe handling apparatus, which may be used for the handling of pipe having threaded end portions without danger of injury to the thread, and which releasing mechanism automatically resets itself after releasing a pipe section, so that it may be immediately used for conveying the next section.

A still further object of the invention is to provide pipe handling apparatus which is simple in design and of strong construction, having few operating parts likely to become worn or damaged from long use, and which is capable of withstanding the conditions of usage and exposure to which such apparatus is likely to be subjected.

The invention will best be understood from the following detailed description constituting a specification of the same, when taken in conjunction with the annexed drawings wherein—

Figure 1 is a side elevational view showing the invention in its application to an oil well derrick;

Figure 2 is a fragmentary view on a somewhat enlarged scale showing the pipe engaging and supporting means with a pipe section thereon in position to be conveyed from the derrick to the storage location;

Figure 3 is a fragmentary view, similar to Figure 2 showing the pipe conveying apparatus at the moment the same has reached its destination and is about to be operated to automatically release the pipe;

Figure 4 is a fragmentary view similar to Figure 3, showing the operation of the apparatus in releasing the pipe;

Figure 5 is a side elevational view on an enlarged scale of the trip lever of the pipe engaging and supporting device;

Figure 6 is a bottom view of the same;

Figure 7 is a side elevational view on an enlarged scale of the pipe engaging member of the pipe engaging and supporting device;

Figure 8 is an end view of the same looking at the right hand end of Figure 7;

Figure 9 is a side elevational view of the latch member of the pipe engaging and supporting device;

Figure 10 is a bottom view of the same.

Referring now to the drawings in greater detail, wherein like numerals of reference indicate the same parts throughout the several views, the numeral 10 indicates generally a conventional derrick, such as is commonly used in connection with oil well operations.

Such derricks are usually provided with a floor, as 12, at an elevation above the ground level, and at one side of the derrick a ramp 14 rises from the ground level to the level of the derrick floor. A roller, such as that indicated at 16 is usually supported at the edge of the derrick floor adjacent the ramp, over which roller sections of pipe may be rolled in moving the pipe into and out of the derrick. A pulley 18 may be supported in the derrick above the floor, about which a cable 20 runs, which cable is operatively attached to a cable winding mechanism, not shown. The end of the cable within the derrick is attached to a grapple, such as that indicated at 22, for the purpose of gripping one end of a pipe section 24, so that the same may be elevated in the derrick.

The derrick arrangement described above is of conventional design forming no part of the present invention.

In order to facilitate the removal of pipe sections as the same are withdrawn from the well by the above apparatus and disconnected, a cableway 26 is secured at one end to the derrick above the platform or floor 12 and extends outwardly and downwardly therefrom over the ramp 14 to some convenient location where it may be suitably anchored by conventional means not shown.

A pipe engaging and supporting device, generally indicated at 28 is carried by the cableway for movement therealong; and this device has an eye 29 which is connected to a return line 30, which passes over pulleys 32 and 34 secured to the upper portion of the derrick, the line extending downwardly into the derrick and having a counter weight 36 attached to its inner end. The counterweight 36 is preferably adjustable and is somewhat heavier than the pipe engaging and supporting device in order to assure return of the device to the derrick when the pipe section has been released therefrom.

The pipe engaging and supporting device 28 is attached to a carriage, made up of spaced side plates 40 and 42, between which grooved wheels 44 and 46 are journaled on shafts 48 and 50, respectively.

The carriage is thus adapted to roll freely along the cableway 26. The carriage has at its lower end a bearing 58 mounted between the plates 40 and 42. A pair of spaced links 60 and 62, are attached at their upper ends to the bearing 58 of the carriage and carry the pipe engaging and releasing mechanism by which the pipe is supported from the carriage.

Between the lower ends of the links 60 and 62 a pipe engaging member 64 is pivoted on a shaft 66 connecting the links, and this member has a pipe engaging arm 68, which is adapted to be inserted in the end of the pipe section being supported thereby. At its opposite end the member 64 is enlarged and formed with the longitudinally spaced shouldered portions 70 and 72, respectively, for cooperation with latch mechanism by which the member is releasably retained in pipe engaging position. A trip lever 74 is pivotally secured on a shaft 76 between the links 60 and 62, immediate the ends thereof, which trip lever has an enlarged extension 78 for engagement with suitable stop means, by which the trip mechanism is operated. The trip lever also has a pair of spaced lugs 80 and 82, which are perforated, as seen at 84 to receive a pivot pin 86 by which the latch 88 is pivotally secured to the trip lever. The latch 88 has a reduced portion 90 at one end, which is perforated as indicated at 92 to receive the pin 86 by which the latch is pivotally secured to the trip lever, and is also formed with a shouldered portion 94 immediate its ends. The shouldered portion 94 and the end 96 of the latch are adapted to engage the shouldered portions 70 and 72 respectively of the member 64, to retain said member in pipe engaging position, as will best be seen in Figures 2 and 3 of the drawings. In the pipe engaging position of the device the enlarged end 78 of the trip lever extends outwardly from the device in position to engage stop means by which the device is operated to release the pipe when it has reached its destination.

To the cableway 26 at the desired position of release a stop member 98 is clamped, this stop member being conveniently formed in two parts 100 and 102, which are bolted together about the cableway by the bolt 104 to securely attach the stop member at the desired location. The part 102 of the stop is formed with a downwardly and outwardly projecting arm 106, which is positioned to be engaged by the enlarged end portion 78 of the trip lever 74, to accomplish the release of the pipe from the conveyor.

In operating the invention as described above a section of pipe 24 is withdrawn from the well, by means of the grapple 22 and cable 20, and suspended in the derrick. The operator may then swing the lower end of the pipe toward the front edge of the derrick floor 12 and insert the arm 68 of the member 64 in the lower end of the pipe, as best seen in Figure 2 of the drawing. The section of pipe is then gradually lowered by the grapple 22, so that the supporting device 28 moves downwardly along the cableway 26 carrying the lower end of the pipe to the desired location. As the pipe is lowered the same will engage the roll 16 on the derrick, whereby the pipe will readily move out of the derrick and down the ramp 14. When the carriage reaches the desired location the end 78 of the trip lever will engage the arm 106 of the stop, rotating the trip lever 74 and releasing the latch 88 from engagement with the member 64, whereupon the member 64 will rotate to permit the pipe to drop.

As soon as the pipe has been released from the conveyor the arm 68 is returned to pipe-engaging position by reason of the weight of the enlarged end of the member 64, which is heavier than the arm. The trip lever 74 is also returned to its stop-engaging position by reason of the weight of the enlarged end 78, and such movement of the trip lever results in lifting of the latch 88 to a position in which it may fall into engagement with the member 74, to latch said member in pipe-engaging position. Thus, after each releasing operation of the conveyor the same returns automatically to pipe-engaging condition, and is returned to the derrick for use with the next section of pipe to be conveyed.

It will be noted that the latch 88 engages two shouldered portions on the members 64, and is of such a length that it cannot fail to engage the member when the apparatus is returned to pipe engaging position. This construction provides a very secure and positive latching of the apparatus in pipe-engaging position, so that there is no danger of premature release of the pipe, while at the same time quick release of the pipe is assured as well as the automatic return of the apparatus to pipe engaging condition for immediate further use. Thus, in the manner described, successive pipe sections can be rapidly removed from the derrick and conveyed to the storage place as the same are withdrawn from the well.

The invention has been disclosed in connection with a specific embodiment of the same, but it will be obvious that this is intended by way of illustration only, and the construction and arrangement of the various parts can be widely varied without departing from the spirit of the invention or the scope of the appended claims.

What is claimed as new and desired to secure by Letters Patent is:

1. Pipe conveying apparatus comprising a carriage moveably supported on a cableway, a pair of spaced parallel links pivotally connected at their upper ends to the carriage, a pipe-engaging member pivotally supported between the lower ends of the links and moveable by gravity into pipe-engaging position, a trip lever pivotally supported between the links above said member and having a pair of spaced parallel lugs at one end thereof, a latch pivotally supported between said lugs, said lever being rotatable in one direction by gravity to engage said latch with said member to hold said member in pipe-engaging position, and said trip lever being rotatable in the other direction to disengage the latch from the member.

2. Pipe conveying apparatus comprising a carriage movably supported on a cableway, a pair of spaced parallel links pivotally connected at their upper ends to the carriage, a pipe-engaging member pivotally supported on the links between the lower ends of the links and moveable by gravity into pipe-engaging position, a trip lever pivotally supported between the links above said member, a latch pivotally carried on one end of said lever, counterweight means on the other end of the lever operable under the influence of gravity to move said lever in a direction to position said latch to engage said member to hold the member in pipe-engaging position, said lever being movable in the other direction to release said latch from said member.

References Cited in the file of this patent

UNITED STATES PATENTS

| Number | Name | Date |
|---|---|---|
| 1,241,476 | French | Sept. 25, 1917 |
| 1,510,580 | Bryen | Oct. 7, 1924 |
| 1,902,582 | Riblet | Mar. 21, 1933 |
| 1,986,420 | Webb et al. | Jan. 1, 1935 |
| 2,425,292 | McCoy | Aug. 12, 1947 |
| 2,463,803 | Pilch | Mar. 8, 1949 |
| 2,539,751 | Olsen | Jan. 30, 1951 |